(12) United States Patent
Friedmann et al.

(10) Patent No.: US 6,428,445 B1
(45) Date of Patent: Aug. 6, 2002

(54) TRANSMISSION

(75) Inventors: Oswald Friedmann, Lichtenau-Ulm; Ivo Agner, Bad Homburg, both of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 61 days.

(21) Appl. No.: 09/678,774

(22) Filed: Oct. 4, 2000

(30) Foreign Application Priority Data

Oct. 4, 1999 (DE) .......................................... 199 47 665

(51) Int. Cl.[7] .............................................. B60K 41/12
(52) U.S. Cl. .............................. 477/44; 477/50; 474/28
(58) Field of Search ............................ 477/44, 50, 45; 474/18, 28

(56) References Cited

U.S. PATENT DOCUMENTS

| | | | |
|---|---|---|---|
| 4,422,719 A | 12/1983 | Orcutt | 350/96.3 |
| 4,827,804 A | * 5/1989 | Tezuka et al. | 74/866 |
| 5,085,107 A | * 2/1992 | Tatara | 74/866 |
| 5,095,776 A | * 3/1992 | Sato | 74/890 |
| 5,257,960 A | * 11/1993 | Sato | 474/69 |
| 5,725,447 A | 3/1998 | Friedmann et al. | 192/3.58 |
| 6,129,188 A | 10/2000 | Friedmann et al. | 474/18 |

FOREIGN PATENT DOCUMENTS

| | | | |
|---|---|---|---|
| DE | 195 46 293 A 1 | 6/1996 | |
| DE | 198 26 747 A 1 | 1/1999 | |
| JP | 7-198947 | 8/1995 | G02B/6/00 |
| JP | 7-198951 | 8/1995 | G02B/6/00 |
| JP | 8-15527 | 1/1996 | G02B/6/00 |

OTHER PUBLICATIONS

U.S. Ser. No. 09/678,819 (Matsumoto et al.), filed Oct. 4, 2000 Attorney Docket No.: 54906USA1A.005.

* cited by examiner

*Primary Examiner*—Charles A Marmor
*Assistant Examiner*—Tisha D. Lewis
(74) *Attorney, Agent, or Firm*—Darby & Darby (57) ABSTRACT

A transmission has an rpm-converter controlled by a hydraulic system. The hydraulic system has a supply circuit from a fluid-conveyor device to the rpm-converter, a return circuit to carry the spent fluid back from the rpm-converter, and a run-off circuit to return the run-off portion of fluid from a flow-regulating device that regulates the volume flow in the supply circuit. The return circuit and the run-off circuit are merged in a circuit junction that continues into a flow-back circuit.

28 Claims, 5 Drawing Sheets

TRANSMISSION

BACKGROUND OF THE INVENTION

The invention relates to a transmission, specifically an automatic, continuously variable transmission. Known transmissions of the kind discussed hereinafter have an rpm-converter means for converting an input rate of rotation (input rpm rate) to an output rpm rate, a transmission-control system for the rpm-converter means, as well as a supply circuit for the rpm-converter means into which a working fluid is fed by a fluid-conveyor device. The supply circuit carries the working fluid supplied by the pump by way of the transmission-control system to the rpm-converter means for setting different rpm-conversion ratios. A return circuit carries return fluid out of the rpm-converter means and/or the control system, e.g., to a reservoir tank for the working fluid. At least one branch conduit runs from the return circuit to provide at least one cooled and/or lubricated element of the transmission with working fluid. The transmission is further equipped with a flow-regulating device in the supply circuit, e.g., downstream of the fluid-conveyor device. The flow-regulating device has a run-off circuit to carry away the run-off portion of pressure that occurs as a result of the regulating function. The run-off circuit can lead to the reservoir tank or to the intake of the fluid-conveyor device to recharge the latter with working fluid. A transmission of this kind is shown, e.g., in DE 198 26 747 A1. A switching valve is arranged in the return circuit, whereby the working fluid flowing back from the rpm-converter means can either be directed to the intake of the fluid-conveyor device or supplied as a coolant to a clutch. The transmission described in DE 198 26 747 A1 is preferably configured as a continuously variable transmission. Another continuously variable transmission is known, e.g. from DE 195 46 293 A1.

In automatic transmissions as described above, it is necessary to limit by means of the flow-regulating device the maximum rate at which working fluid flows to the transmission-control system and is made available to be directed to the rpm-converter means. The purpose of this regulation is to avoid excessive levels of backup pressure and losses in the conduits. In addition, the regulation allows the valves, particularly those of the transmission-control system, to be designed for a low flow rate, whereby the regulating performance is improved. As mentioned above, the run-off portion of the working fluid that occurs as a result of the regulating process can be used to charge the intake of the fluid-conveyor device, whereby the noise-generating properties of the fluid-conveyor device are improved. Thus, the flow-regulating device divides the total volume flow from the fluid-conveyor device into the regulated portion that is directed to the rpm-converter means and the run-off portion that is directed back to the reservoir tank or to the intake of the fluid-conveyor device. The working fluid returning from the high-pressure circuit (transmission-control system and rpm-converter means) is tapped off from the return circuit to be used with first priority for cooling and lubricating. Thus, the amount of fluid available as lubricant and coolant consists only of the remainder of the regulated portion after subtracting the control-system leakage and the dynamic flow-rate requirement of the rpm-converter means.

This creates a conflict between design objectives in transmissions of the known state of the art. On one hand, a sufficient amount of lubricant/coolant medium has to be available in order to avoid thermal instabilities in the thermal balance of the transmission even under worst-case conditions. This requires large quantities of fluid. On the other hand, there are also the objectives of keeping the pressure losses small and using compact dimensions in the transmission control system and its components, which requires relatively small quantities of fluid. Consequently, this causes a conflict because the control of the transmission requires a smaller amount of fluid than the lubricating and cooling functions.

OBJECT OF THE INVENTION

It is therefore the object of the present invention to provide an automatic transmission that belongs to the kind of transmissions described above but does not have the disadvantage of the aforementioned design conflict.

SUMMARY OF THE INVENTION

The invention meets the foregoing objective in an automatic transmission with an rpm-converter means, a control system for the rpm-converter means, and a supply circuit leading to the rpm-converter means. A pump feeds working fluid to the supply circuit, and a return circuit carries spent working fluid back from the rpm-converter means and/or the control system. The transmission also has at least one cooled and/or lubricated element that is supplied by the return circuit. A flow-regulating device is arranged in the supply circuit, and a run-off circuit removes the run-off portion of working fluid from the flow-regulating device. In a transmission according to the invention, the return circuit coming from the rpm-converter means and/or the transmission-control system and the run-off circuit carrying the run-off fluid from the flow-regulating device merge at a circuit junction. After the confluence at the circuit junction, the united streams from the return and run-off circuits continue in a combined flow-back circuit. As a result of this arrangement, the regulated portion of the working fluid that is returned from the high-pressure domain and the run-off portion that is removed by the flow-regulating device are reunited. Thus, in addition to the remainder of the regulated portion after subtracting the control-system leakage and other usages of fluid, the run-off portion itself, which has been removed by the flow-regulating device, becomes available to be supplied to components that need lubricating and/or cooling. The total flow-rate of the flow-back circuit depends, as a first approximation, on the rpm rate of the engine to which the automatic transmission is connected. In power-transmitting elements, e.g., in the rpm-converter means, the required lubricant/coolant quantity, likewise, depends on the engine rpm rate, because the maximum amount of power to be transmitted increases in nearly linear proportion with the engine rpm rate. Thus, the available amount of working fluid is harmonically matched to the fluid requirement for lubricating and cooling, so that the heat that is being generated can be carried away by the lubricant/coolant medium even at high engine-rpm rates. In other words, although a constant rate of fluid flow can be made available for the transmission control system as well as the rpm-converter means over the entire rpm range of the engine, the lubricated and/or cooled elements can be supplied with a larger volume of working fluid depending on the engine rpm rate, as the fluid-conveyor device is driven at the rpm-rate of the engine and therefore recirculates increased amounts of fluid at higher engine-rpm rates, with the excess flow being directed to the run-off circuit at the flow-regulating device.

A preferred embodiment of the invention has a charging circuit that leads from the flow-back circuit to the intake portion of the pump. Thus, the flow-back circuit, which carries the working medium coming from the high-pressure area as well as the run-off from the flow-regulating device, also supplies the intake portion of the fluid-conveyor pump in addition to the cooled and/or lubricated element(s), so that the intake portion can be charged, whereby the noise-generating properties of the fluid-conveyor device are improved.

It is further preferred according to the invention to have at least one lubricant/coolant circuit branching off from the flow-back circuit and leading to the at least one cooled and/or lubricated element. Thus, both the at least one cooled and/or lubricated element and the intake portion of the fluid-conveyor device are supplied with working fluid from the flow-back circuit.

An especially preferred embodiment has a cooler and/or converter arranged in the return circuit upstream of the confluence of the return circuit and the run-off circuit. This prevents that too much working fluid is conducted through the converter or cooler. Particularly at times when the working fluid is at a cold temperature, the increased levels of back-up pressure could cause damage to the converter and/or cooler. However, by arranging the converter or cooler in the return circuit, which carries only the remainder of the regulated portion after subtracting the control-system leakage and the dynamic flow-rate requirements, the converter and/or cooler are protected against damage from excessive levels of fluid pressure.

It is, of course, possible to supply more than one cooled and/or lubricated element by way of the return circuit in an arrangement where each of the cooled and/or lubricated elements is supplied by coolant/lubricant circuit. Preferably in this arrangement, all cooled and/or lubricated elements are supplied in parallel out of the flow-back circuit. In a further developed version of the invention, the charging circuit is arranged to run parallel to the at least cooled and/or lubricated element. With the parallel arrangement of the cooled and/or lubricated elements and the charging circuit, it is possible to make the required amount of returning working fluid available as needed at each lubricated element.

A particularly preferred embodiment of the invention has a switching device arranged downstream of the circuit junction, i.e., in the flow-back circuit. The switching device serves to selectively direct at least a part of the working fluid in the flow-back circuit to flow either to a cooled and/or lubricated element or to the intake portion of the pump. This makes it possible to supply working fluid through the switching device to those lubricated elements that require working fluid only for short time intervals. If a lubricated element does not require fluid any longer, the fluid stream can be switched over to the charging circuit to resume charging the intake portion of the pump.

In an embodiment of the invention, the at least one cooled and/or lubricated element is a start-up clutch. As a particular feature of this embodiment, the witching device selectively supplies working medium either to the start-up clutch or to the intake portion of the fluid-conveyor device. This allows the start-up clutch to be supplied with lubricant/coolant fluid for short time intervals. The amount of lubricant/coolant fluid required for the start-up clutch is in direct proportion to the amount of torque to be transmitted and the slippage between the input and output of the start-up clutch. However the need for cooling fluid approaches zero as soon as the clutch is entirely engaged. Under these conditions, it can be particularly advantageous to supply the required quantity of coolant/lubricant by way of the switching device to the start-up clutch only during the time periods when it is needed and to use that fluid quantity for charging the fluid-conveyor device during the rest of the time.

A further developed embodiment of the invention has a hydraulic flow restrictor in each lubricant/coolant circuit and in the charging circuit. Through an appropriate design choice of the flow restrictor, e.g., a throttle, a narrow aperture or the like, each lubricated element can be supplied with the required amount of lubricant/coolant medium.

In embodiments of the invention that are equipped with the switching device, it is preferred if the flow restrictors in the clutch-cooling/lubricating circuit and in the charging circuit are dimensioned equally. Thus, the resultant total flow-circuit resistance is independent of the switch position of the switching device, which assures that the lubricated elements are supplied with the required amount of lubricant/coolant regardless of switch position.

In a preferred embodiment of the invention, the parallel-operating flow restrictors are dimensioned such that a minimally required system pressure of the working fluid will not be exceeded as a result of the combined hydraulic resistance. This means that the combined hydraulic resistance is designed so that the minimum system pressure can also be attained in the system. This can be acomplished, e.g., by arranging a pressure-limiting valve in the flow-back circuit, which releases the pressure in the flow-back circuit into an area of lower pressure. In particular, the pressure is released into the charging circuit, so that the run-off fluid from the pressure-limiting valve can be used to charge the fluid-conveyor device.

In a preferred embodiment, the switching device is controlled by a switching valve to selectively supply either the start-up clutch or the charging circuit.

In a particularly preferred embodiment, the switching device has a pressure-limiting function in addition to the switching function. This allows the quantity of lubricant/coolant fluid or charge fluid to be adjusted to demand. Preferably, the switching device is controlled by a proportional valve, so that a variable pressure limit can be set at the switching device. In particular, the switching device or, more specifically, the pressure-limiting function is controlled in function of the engine-rpm rate, the slippage of the start-up clutch and/or the speed of the vehicle that is equipped with the automatic transmission according to the invention. The setting of the pressure limit can be in a continuous range or in steps. The switching valve with the integrated pressure-limiting function is preferably designed as a switching valve with the pressure-limiting function as described in a great variety of embodiments in DE 199 22 232.0. The different embodiments of the switching valve with integrated pressure-limiting function are shown in FIGS. 8 through 14 of DE 199 22 232.0.

In a preferred embodiment of the invention, the automatic transmission is a continuously variable transmission, particularly of the kind where the rpm-converter means is a so-called cone-pulley belt-drive transmission.

If in the parked vehicle, the switching device is left in a position where the intake portion of the fluid-conveyor device is directly connected to a lubricated element, it is possible especially at cold temperatures that air will be sucked in through the lubricated element when the fluid-conveyor device is set in motion, i.e., when the vehicle is started and moved. To avoid this condition, the charging circuit is equipped with a threshold-pressure valve that opens the charging circuit only after a given amount of differential pressure has been attained between the flow-back circuit and the charging circuit.

The threshold-pressure valve is preferably configured as a seat valve to provide a tight closure of the intake portion of the fluid conveyor device against a lubricated element.

In a further developed embodiment, the threshold-pressure valve comprises a valve piston that is movable in its valve bore against the opposing force of a spring device in such a manner that in one piston position, the intake portion of the fluid conveyor device is closed off while in the other position, the charging circuit is set free.

Preferably, the piston of the threshold-pressure valve is configured as a stepped piston. Accordingly, the valve bore is designed as a stepped bore. This provides a simple way of arranging the seat of the threshold-pressure valve in the transitional area of the valve bore where the step of the valve piston meets the step of the valve bore, with the step of the piston carrying the seat face. The arrangement where the seat face, i.e., the sealing interface, is provided at the step of the piston, greatly facilitates the grinding of the sealing surface, e.g., with a stepped grinding wheel, resulting in a very good alignment of the piston face in relation to the piston axis.

If necessary, in view of the high level of surface pressure at the valve seat, at least the seat face can be configured as a wear-resistant insert component. With preference, both the valve piston and the housing that contains the valve bore are made from materials with matching coefficients of thermal expansion, so that even with variations in the working temperature, a sealing contact is maintained along the surface where the piston is guided in the valve bore, in order to avoid or at least minimize the leakage of working fluid.

In a preferred embodiment of the invention, the valve seat is recessed. In other words, the step in the valve bore is provided with a cutback along its internal circumference, whereby a ring-shaped step is formed with an open internal border towards the piston. This results in a good alignment of the edge of the valve seat in relation to the cylindrical valve bore.

Also, in preferred embodiments of the invention, the valve seat and the seat face have a conically sloped shape.

In a preferred embodiment, the insert component has the shape of a ring that can be slid onto the piston. With this arrangement, it is especially preferred for the valve piston to have a larger diameter at the side facing the valve seat than at the side that faces away from the valve seat, with the diameter at the side facing away from the valve seat being smaller than the internal ring diameter of the insert component. This allows the insert component to be easily slid over the end of the piston that faces away from the valve seat for the installation of the insert component on the step or, more specifically, on the seat face. Thus, the insert component can be made as a closed ring that is merely put in place on the piston. Under a special concept for the manufacture of the piston with the insert component, the insert component is first put in place on the step, i.e., at the seat face of the valve piston and, subsequently, the finishing operations are performed on the insert component together with the seat face of the piston.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed description of the invention is based on the attached drawing in which.

DETAILED DESCRIPTION OF THE INVENTION

In the following discussion, the automatic transmission is assumed to be a continuously variable transmission in which the rpm-converter means works in a stepless range of transmission ratios and, with preference, is realized in the form of a so-called cone-pulley belt-drive transmission. An rpm-converter means of this kind is also described in a more detailed manner in the documents DE 198 26 747 Al and DE 195 46 293 Al, which have been cited at the beginning. This assumed configuration of the transmission has exemplary character only, and it is to be understood that other means of rpm-conversion could also be used.

Figure 1:
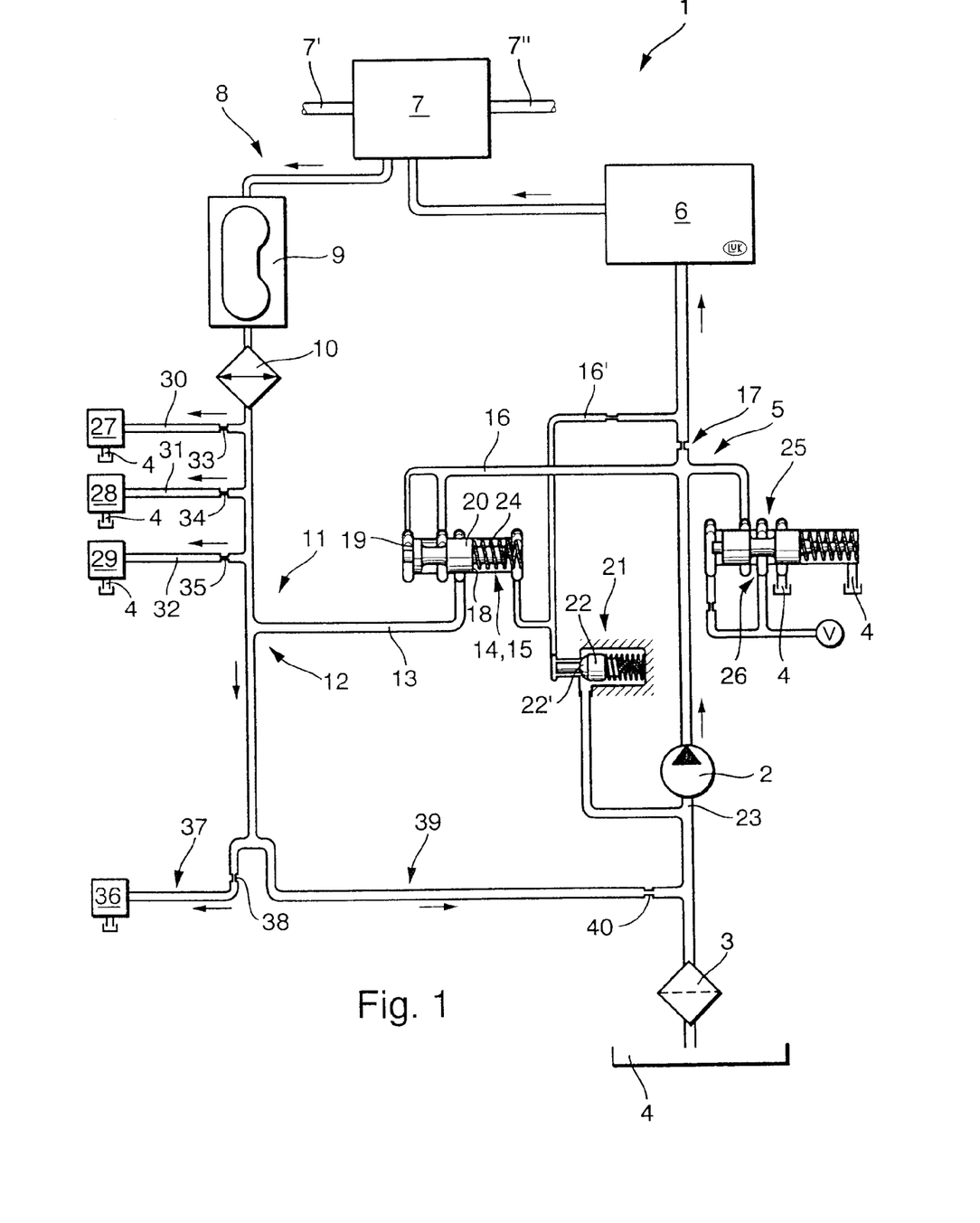
FIGS. 1 to 4 show separate individual embodiments of an automatic transmission.

FIG. 1 illustrates an automatic transmission 1 in a strongly simplified representation of only those parts that are essential to the invention. The transmission 1 has a fluid-conveyor device 2 which, by way of a filter 3, pumps working fluid from a reservoir 4 through a supply circuit 5 to a transmission control system 6 controlling an rpm-converter means 7. A return circuit 8 conducts the spent working fluid from the high-pressure domain (transmission control system 6 and rpm-converter means 7) back to the reservoir 4 by way of components that will be described below. In the return circuit 8, the rpm-converter means 7 is preferably followed by a converter 9 which, in turn, can be followed downstream by a cooler 10 for the working fluid. Next in sequence after the cooler 10, the return circuit 8 is followed by a flow-back circuit 11 that starts at a circuit junction 12 where the return circuit 11 and a run-off circuit 13 are merged. The run-off circuit 13 originates at a flow-regulating device 14 that regulates the flow of working fluid arriving through the supply circuit 5 to a set flow-rate of a prescribed magnitude, so that an essentially constant, regulated stream of working fluid can be supplied to the transmission control system 6 and the rpm-converter means 7 independent of the quantities pumped by the fluid-conveyor device. To perform this function, the flow-regulating device 14, which can be a volume-flow regulating valve 15, has a connection 16 to the supply circuit 5. The supply circuit 5 further contains a hydraulic flow restrictor 17. The connector conduit 16 runs upstream and a connector conduit 16' runs downstream of the flow restrictor 17 to the respective pressure-return surfaces 18 and 19 of the flow-regulating piston 20 of the flow-regulating valve 15. The connector conduit 16' that applies pressure to the pressure return surface 18 runs further to a so-called pressure pilot 21 that limits the maximally possible pressure level in the supply circuit 5, i.e., functions as a pressure-limiting valve. When the pressure pilot 21 is triggered into action, its spring-biased valve body 22 uncovers an opening 22', so that working medium is returned to the intake portion 23 of the fluid-conveyor device 2. However, not the entire fluid stream flows through the pressure pilot 21, because the pressure release caused by the action of the pressure pilot 21 lowers the pressure level of the fluid that pushes against the pressure return-surface 18, so that the valve piston is moved against the force of a spring 24, whereby the run-off circuit 13 is set free, so that working fluid leaves the supply circuit 5 through the run-off circuit 13.

As indicated schematically, the rpm-converter means 7 has an input shaft 7' where an input torque is received and an output shaft 7" where an output torque is delivered. Depending on the transmission ratio set at any given time, the input shaft and the output shaft can turn at different rpm rates. Following the output shaft 7" in the torque flow path, the drive train preferably contains clutches for forward and reverse movement of the vehicle that is equipped with the transmission 1.

Also connected to the supply circuit 5 is a pressure-reducing valve 25 delivering at its output port 26 a controlling pressure V that is used to adjust solenoid valves in the automatic transmission 1.

Out of the flow-back circuit 11 in which the fluid streams of the return circuit 8 and the run-off circuit 13 are united, at least one or more cooled and/or lubricated elements of the automatic transmission 1 are supplied with working fluid that also serves the additional purpose of cooling and/or lubricating. The illustrated example has three cooled and/or lubricated elements 27, 28 and 29. The cooled element 27 is, e.g., the cooling means for the rpm-converter means 7. The cooled and lubricated element 28 is, e.g., a spur gear of the transmission 1, and the cooled and lubricated element 29 is, e.g., a so-called centrifugal oil bonnet. The lubricant/coolant circuits 30, 31 and 32 branching off from the flow-back circuit 11 run parallel to each other. Hydraulic flow restrictors 33, 34, 35 are arranged in the lubricant/coolant circuits 30, 31 and 32, respectively. The hydraulic flow restrictors 33 through 35 are dimensioned appropriately, so that every lubricated element receives the required amount of working fluid.

Connected to the flow-back circuit 11 is a further cooled and/or lubricated element 36 that is preferably constituted by a clutch disc set (not shown in the illustration) of a start-up clutch of the transmission 1. The lubricated element 36 is connected to the flow-back circuit 11 through a further lubricant/coolant circuit 37 which is also equipped with a hydraulic flow restrictor 38. Finally, the flow-back circuit 11 supplies a charging circuit 39 leading to the intake portion 23 of the fluid-conveyor device 2. The charging circuit 39 also contains a hydraulic flow resistor 40. As FIG. 1 illustrates, all of the lubricant/coolant circuits 30 to 32 and 37 as well as the charging circuit 39 work in parallel. The hydraulic flow restrictors 33 to 35, 38 and 40 serve to set the flow-rates of the working fluid according to the respective requirements of the individual cooled and/or lubricated elements supplied by the lubricant/coolant circuits. With preference, the parallel-acting flow restrictors 33 to 35, 38 and 40 are dimensioned so that their combined hydraulic resistance allows a minimally required amount of system pressure of the working fluid to be maintained.

As can further be seen in FIG. 1, the circuit junction 12 lies downstream of the cooler 10 and/or converter 9, so that the converter 9 and cooler 10 receive only that portion of the working fluid that is returned from the supply circuit 5 by way of the transmission control system 6 and the rpm-converter means 7, i.e., no more than the maximum amount of working fluid present in the supply circuit 5 after the regulation by the flow-regulating device 14.

It has been found that the return circuit 8 can be merged with the run-off circuit 13 in the circuit junction 12 into the flow-back circuit 11 in which the working fluid returned from the high-pressure domain and the run-off from the flow-regulating device are brought together and can subsequently be used for the cooling and lubrication of components inside the transmission 1 and for charging the intake portion 23 of the fluid-conveyor device 2. As a result of this arrangement, all of the cooled and/or lubricated elements 27 to 29, 36, as well as the intake portion 23 can be supplied with adequate amounts of working fluid.

Figure 2:
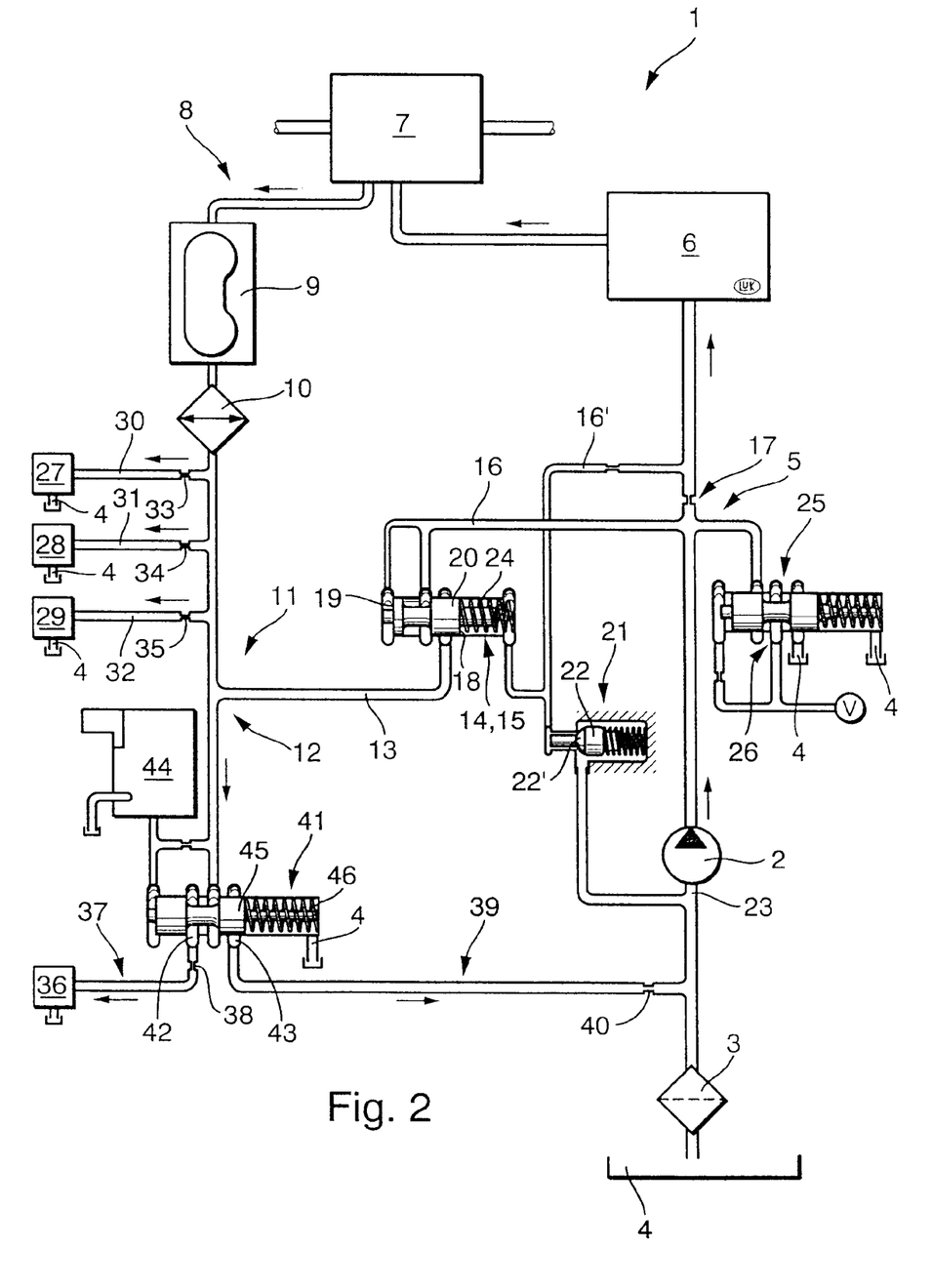

FIG. 2 illustrates a further embodiment of an automatic transmission 1. Parts that are identical or have identical functions as in FIG. 1 are identified by the same reference symbols. To the extent of the identical parts and functions, the foregoing description applies equally to FIG. 2 and will therefore not be repeated below.

The automatic transmission 1 of FIG. 2 is distinguished from the automatic transmission 1 in FIG. 1 by a switching device 41 arranged in the flow-back circuit 11 downstream of the circuit junction 12 and preferably configured as a 3/2-port valve. On the input side, the switching device 41 is connected to the flow-back circuit. Connected to the output port 42 of the switching device is the lubricant/coolant-consuming element 36, preferably constituted by the start-up clutch, which is supplied with working fluid through the lubricant/coolant circuit 37. Connected to the output port 43 is the charging circuit 39. Depending on the switch position of the switching device 41, working fluid is directed either to the lubricant/coolant circuit 37 or to the charging circuit 39. The switching device 41 is controlled by a switching valve 44. Specifically, the switching device 41 has a switching piston 45 guided in a valve bore. Acting on the piston 45 are the opposing force of a spring device 46 on one side and the pressure from the switching valve 44 on the other. Thus, the switching device 41 can connect the flow-back circuit 11 either to the charging circuit 39 or the lubricant/coolant circuit 37, depending on the momentary demand. In particular, the invention provides an operating concept, where the lubricant/coolant circuit 37 is supplied when the vehicle is in a start-up mode, i.e., when the start-up clutch is slipping and the clutch discs will therefore need cooling. After the start-up phase is completed, the switching valve 44 will switch the position of the switching device 41, so that the flow-back circuit 11 is connected to the charging circuit 39 to charge the intake portion 23 of the fluid-conveyor device 2. Since the start-up phase lasts only for a short time interval, the start-up clutch has to be supplied with lubricant/coolant fluid only during that particular time interval.

With preference, the hydraulic flow restrictors 38 and 40 in the embodiment of FIG. 2 have equal flow-resistance values. Thus, the resulting total resistance in the flow-back circuit 11 remains constant, regardless of the position of the switching device 41. Accordingly, the stream of lubricant/coolant through the lubricant/coolant circuits 30, 31 20 and 32 remains the same, independent of whether the lubricant/coolant circuit 37 or the charging circuit 39 is being supplied. As the flow-back circuit 11 also supplies the lubricant/coolant circuits 30 to 32, the switching device 41 directs only part of the fluid in the flow-back circuit 11 either to the lubricant/coolant circuit 37 or the charging circuit 39.

Figure 3:
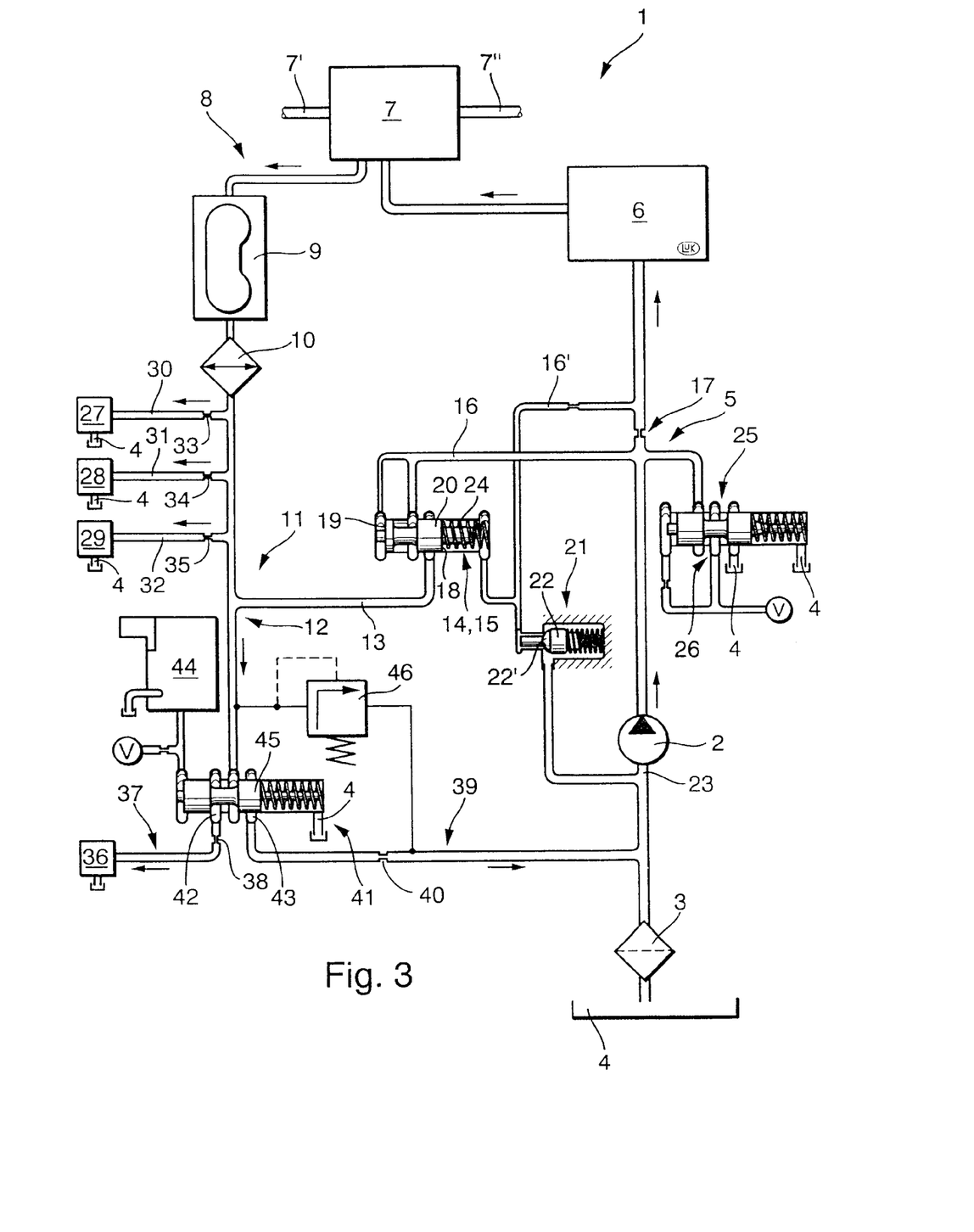

FIG. 3 illustrates a further embodiment of an automatic transmission 1. Parts that are identical or have identical functions as in the preceding FIGS. 1 and 2 are identified by the same reference symbols.

The embodiment of an automatic transmission 1 as shown in FIG. 3 is distinguished from the embodiment of FIG. 2 only by the fact that the flow-back circuit 11 can be connected to the charging circuit 39 by way of a pressure-limiting valve 46. At a given pressure level, the pressure-limiting valve 46 opens up a connection from the flow-back circuit 11 to the charging circuit 39. With preference, the connection joins the charging circuit 39 downstream of the hydraulic flow restrictor 40, so that the pressure of the working medium admitted through the pressure-limiting valve is released directly into the reservoir tank or the intake portion 23 of the fluid-conveyor device 2.

Figure 4:
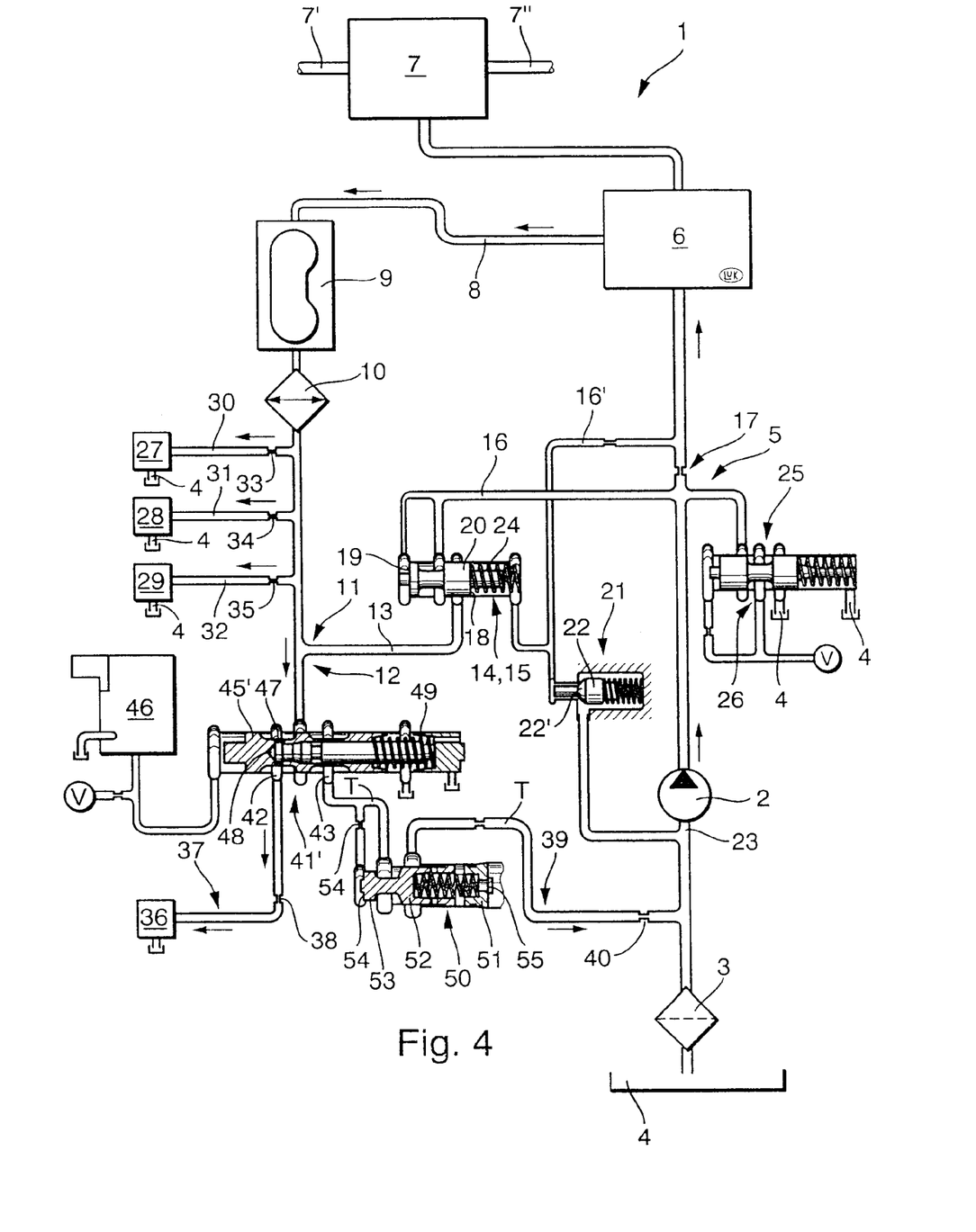

FIG. 4 illustrates a fourth embodiment of an automatic transmission 1. The parts in FIG. 4 that are identical or have identical functions as in the preceding FIGS. 1 to 3 are again identified by the same reference symbols.

According to FIG. 4, the return circuit 8 leads from the transmission control system 6 to the converter 9. This configuration is based on the fact that the return circuit preferably follows after the last pressure-limiting valve in the high-pressure circuit. In FIGS. 1 to 3, the last pressure-limiting valve is a so-called torque sensor, which is used in cone-pulley belt-drive transmissions to set the contact pressure that the cone-pulley discs exert against the chain-belt. In the automatic transmissions of FIGS. 1 to 3, the torque sensor (not shown) acts as a pressure-limiting valve and, consequently, the return circuit follows the torque sensor. In the embodiment of FIG. 4, however, the last pressure-limiting valve is arranged in the transmission control system 6 and is configured, e.g., as a combined switching and pressure-limiting valve. In this embodiment of the invention, the torque sensor of the rpm-convertor device 7 functions as a pressure-reducing valve. Accordingly, the return circuit 8 originates from the transmission control system 6.

In place of the switching device 41 of FIGS. 2 and 3, which performs only a switching function, the automatic transmission of FIG. 4 has a switching device 41' that is equipped with an integrated pressure-limiting function. Switching devices of the kind that includes a pressure-limiting function are described in DE 199 22 232.0 in several exemplary embodiments and could be used as the switching device 41' in the present invention. The switching device 41' is controlled by a proportional valve 46. When the switching piston 45' is in the position shown in FIG. 4, the flow-back circuit 11 is connected to the lubricant/coolant circuit 37. To perform the pressure-limiting function, the switching piston 45' has a transverse bore 47 running essentially transverse to the lengthwise direction of the piston. This allows the pressure in the flow-back circuit 11 to act against a surface 48, so that the pressure of the working fluid in the flow-back circuit 11 pushes the switching piston 45' in the same direction as the force of the spring 49 that acts on the valve piston 45'. When the pressure reaches a threshold, whose magnitude can be preset, the switching piston 45' is moved leftward in relation to the illustrated arrangement, so that its shutter gate opens up the connection between the flow-back circuit 11 and the charging circuit 39, whereby the pressure is released from the flow-back circuit into the charging circuit 39.

The proportional valve 46, which is provided for the control of the switching device 45', allows a variable setting of the pressure limiting threshold. Alternatively, the proportional valve 46 also allows the pressure limiting threshold to be held at a constant level. By means of the combined switching and pressure-limiting function of the switching device 41', the pressure-limiting function can be made available either to the lubricant/coolant circuit 37 or to the charge circuit 39. Of course, it is also possible to realize a pressure-limiting function that works in any switch position, i.e., the pressure-limiting function can selectively be active in both switching directions.

The charging circuit 39 in FIG. 4 contains a so-called threshold-pressure valve 50 that is configured as a seat valve. The threshold-pressure valve 50 has a valve piston 52 movable in a valve bore 53 against the force of a spring 51. A pressure-receiving surface 54 of the valve piston 52 is acted on by working fluid entering from the flow-back circuit 11 by way of a damper throttle 54, provided that the switching device 41' is in the switching position in which the flow-back circuit 11 is connected to the charging circuit 39.

The threshold-pressure valve functions as a so-called pressure-differential valve that releases the fluid path between port 43 and intake portion 23, if the pressure differential in both of the conduit branches T reaches a certain level that can be preset by means of an adjustment device 55 that serves to set the pre-tensioning force of the spring 51. The reason for providing the threshold-pressure valve 50 in the charging circuit 39 is to prevent air from getting sucked into the fluid-conveyor device 2 during a start-up phase of the latter from one of the cooled and/or lubricated elements 27 to 29, or 36, provided that the switching device 41' is in the appropriate switching position. In other words, the arrangement of the threshold-pressure valve 41' between the switching device 41' and the intake portion 23 of the fluid-conveyor device serves to ensure that with a maximum possible pressure differential of 1 bar, no air can be sucked into the fluid-conveyor device by way of the lubricated and/or cooled elements.

Figure 5:
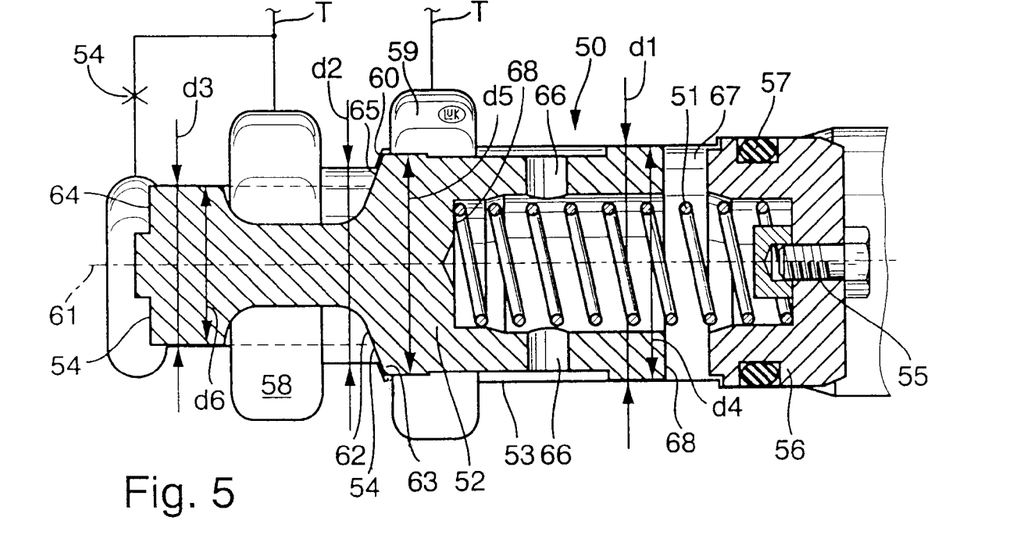
FIGS. 5 and 6 show separate individual embodiments of a threshold-pressure valve of an automatic transmission.

FIG. 5 illustrates a first embodiment of the threshold-pressure valve 50. The valve bore 53 is closed off by a plug 56 that is inserted in the valve bore 53 with a seal-ring element 57. The valve bore 53 is configured with steps and has three sections of different diameter, i.e., a first section with a diameter d1, a second section with a diameter d2, and a third section with a diameter d3. Furthermore, there are internal ring channels 58 and 59 inside the valve bore. Ring channel 58 communicates with the output port 43 of the switching device 41', and ring channel 59 communicates with the intake portion 23 of the fluid conveyor device 2. Adjoining the ring channel 59 in the section of diameter d2 is a valve seat 60 that is conically sloped in relation to the lengthwise central axis 61 of the valve bore 53. Thus, the valve seat is formed in a side wall of the ring channel 59. Coming from the bore section of 25 diameter d1, the valve seat 60 is located at the step or transition to the section of diameter d2. The valve seat is set back in the form of a ring-shaped cut-back in the side wall of the ring channel 59 that is open in the direction of the lengthwise axis 61.

The valve piston 52, likewise, has sections of different diameter. A first diameter d4 of the valve piston 52 is dimensioned so that the valve piston has a sealing contact interface with the valve bore 53 in the section of diameter d1. Adjoining the section of diameter d4 is a further section of the valve piston 52 with a diameter d5. Adjoining the section of diameter d5 after a step 62 is a section of the valve piston with a diameter d6. The latter diameter is dimensioned so that the valve piston has a sealing contact interface with the valve bore 53 in the section of diameter d3. The step 62 of the valve piston 52 is conically sloped. The slope of the step 62 is designed to be parallel to the valve seat 60. Thus, the part of the step 62 that is parallel to the valve seat 60 constitutes a seat face 63 that cooperates with the valve seat 60 to seal the passage. As can be seen in the illustration, the diameter of the valve seat and the seat face 63 is larger than the diameters d3, d2, or d6 and at the same time smaller than the diameters d1 or d4. The pressure-application surface 54 thus has two parts, i.e., the end surface 64 of the valve piston and the ring-shaped area 65 at the step 62.

In addition, the valve piston 52 also has a transverse bore 66 connecting the ring channel 59 to a pressure compartment 67 that is enclosed between the plug 56, the wall of the valve bore 53 and the piston 52. In the closed state of the threshold-pressure valve 50, a second pressure-application surface 68 of the valve piston is thereby connected to the underpressure generated by the fluid-conveyor device 2. When the valve is open, i.e., when the seat face 63 is retracted from the valve seat 60, the second pressure-application surface 68 is subjected to the pressure from the flow-back circuit 11.

The piston has an axial bore, whose bottom represents part of the second pressure-application surface 68 and contains the spring 51, one end of which bears against the bottom of the axial bore hole while the other end is seated against the inside of the plug 56. The pre-tensioning force of the spring is adjustable by means of the adjustment device 55. Consequently, the threshold-pressure valve 50 is a pressure-differential valve that opens, i.e., allows fluid to flow from the ring channel 58 to the ring channel 59, only after a certain pre-settable level of differential pressure has been attained. Thus, the threshold-pressure valve 50 makes it possible to connect the intake portion 23 of the fluid-conveyor device 2 to the flow-back circuit when the pressure differential between the intake portion 23 and the flow-back circuit 11 has reached a pre-settable level.

Figure 6:
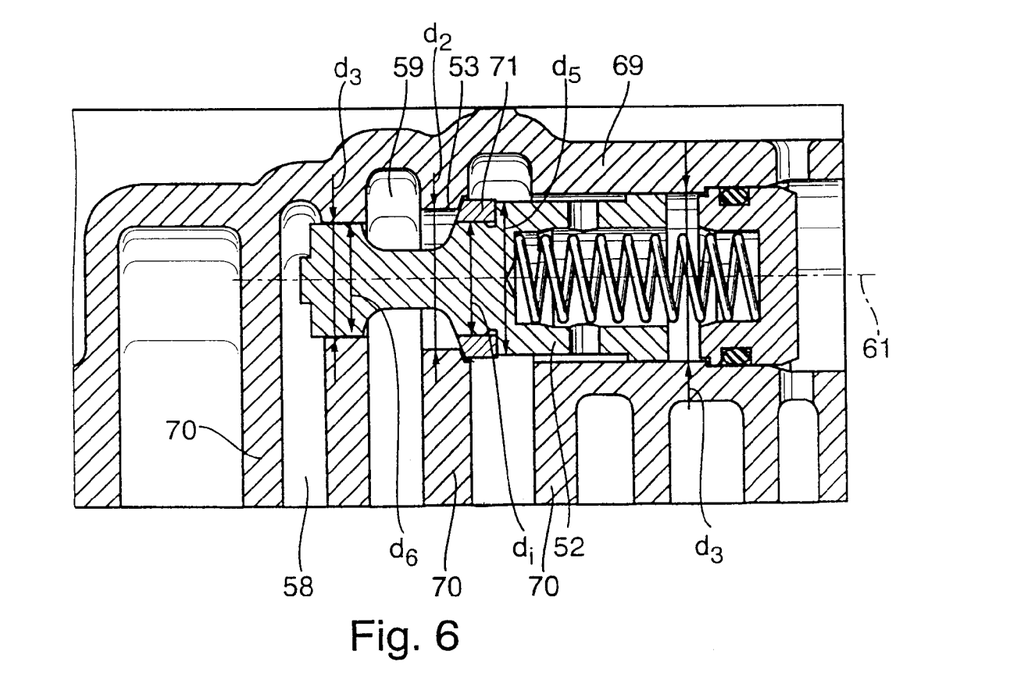

FIG. 6 illustrates a housing 69 containing the valve bore 53. As can be seen, the housing has several baffles 70 spaced apart from each other and oriented substantially perpendicular to the central lengthwise axis 61. The valve bore 53 with its different diameters d1 to d3 is machined through the baffled portion, preferably with a stepped tool whereby all of the bore sections of different diameter can be produced in one operation. As a distinctive feature in relation to the embodiment of FIG. 5, the section of diameter d5 of the valve piston 52 has a ring-shaped recess in which an insert component 71 is seated. The insert component is made preferably of a wear-resistant material and of an annular shape. The internal diameter d1 of the ring-shaped insert component is designed to be slightly larger than the diameter d6 of the valve piston 52, so that the ring-shaped insert component can be slid over the valve piston 52 and installed in the ring-shaped recess.

As shown in the illustration, starting from the section of diameter d6 and proceeding lengthwise, the sections of the valve piston 52 have increasing diameters. This assures a simple manufacturing process of the valve piston by means of a stepped tool. The sections of the bore hole 53, starting from the section of diameter d3, have decreasing diameters so that the valve bore, too, can be made in a simple operation by means of a stepped tool. Overall, the magnitude of dimensional errors is thereby minimized in the manufacturing process of the threshold-pressure valve 50, to that the latter has a very good sealing performance. In particular, the seat face 63 and the valve seat 60 can be produced with suitable shape-grinding tools to obtain a very tight seal in the threshold-pressure valve 50 that is configured as a seat valve.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A transmission comprising an rpm-converter means, a control system for the rpm-converter means, a supply circuit for the rpm-converter means, a fluid-conveyor device feeding a working fluid to the supply circuit, a return circuit carrying spent working fluid back from at least one of the rpm-converter means and the control system, at least one cooled/lubricated element which is supplied by the return circuit with working fluid for at least one of the functions of cooling and lubricating, a flow-regulating device arranged in the supply circuit, and a run-off circuit carrying a run-off portion of working fluid out of the flow-regulating device, wherein the return circuit and the run-off circuit merge at a circuit junction, and the circuit junction continues into a flow-back circuit.

2. The transmission of claim 1, further comprising a charging circuit and an intake portion of the fluid-conveyor device, wherein the charging circuit leads from the flow-back circuit to the intake portion.

3. The transmission of claim 1, further comprising at least one coolant/lubricant circuit branching off from the flow-back circuit and carrying working fluid that is to perform at least one of the functions of cooling and lubricating.

4. The transmission of claim 1, further comprising at least one of a cooler and a converter arranged in the return circuit upstream of the circuit junction.

5. The transmission of claim 3, comprising at least two cooled/lubricated elements that are supplied by the coolant/lubricant circuits.

6. The transmission of claim 5, wherein the cooled/lubricated elements are supplied in parallel out of the flow-back circuit.

7. The transmission of claim 2, wherein the charging circuit is arranged parallel to the at least one cooled/lubricated element.

8. The transmission of claim 2, further comprising a switching device arranged downstream of the circuit junction, whereby at least a part of the working fluid in the flow-back circuit can be switched selectively between the at least one cooled/lubricated element and the intake portion.

9. The transmission of claim 1, wherein the at least one cooled/lubricated element is a start-up clutch.

10. The transmission of claim 2, further comprising at least one hydraulic flow restrictor in each of the at least one coolant/lubricant circuit and in the charging circuit.

11. The transmission of claim 10, wherein the start-up clutch has a clutch-coolant/lubricant circuit and the flow restrictors in the clutch-coolant/lubricant circuit and in the charging circuit are dimensioned equally.

12. The transmission of claim 10, wherein the transmission requires a minimum system pressure of the working fluid, at least a part of the flow restrictors are arranged to operate in parallel and thereby produce a combined hydraulic resistance, and the parallel-operating flow restrictors are dimensioned such that the combined hydraulic resistance does not exceed the minimum system pressure.

13. The transmission of claim 8, further comprising a switching valve to control the switching device.

14. The transmission of claim 1, further comprising a pressure-limiting valve arranged downstream of the circuit junction to release pressure from the flow-back circuit to a portion of the transmission containing a lower level of pressure than the flow-back circuit.

15. The transmission of claim 8, wherein the switching device further performs a pressure-limiting function.

16. The transmission of claim 8, further comprising a proportional valve to control the switching device.

17. The transmission of claim 1, wherein the transmission is a continuously variable automatic transmission.

18. The transmission of claim 17, wherein the rpm-converter means is a cone-pulley belt-drive device.

19. The transmission of claim 2, wherein the charging circuit comprises a threshold-pressure valve that opens the charging circuit at a set pressure level.

20. The transmission of claim 19, wherein the threshold-pressure valve is a seat valve.

21. The transmission of claim 20, wherein the threshold-pressure valve comprises a valve piston, a valve bore, and a spring device generating an opposing force, the valve piston being movable in the valve bore against the opposing force.

22. The transmission of claim 21, wherein the valve piston comprises a piston step and the valve bore comprises a bore step.

23. The transmission of claim 22, wherein the threshold-pressure valve further comprises a valve seat located at the bore step and a seat face located at the piston step.

24. The transmission of claim 23, wherein the valve piston comprises a wear-resistant insert component at the seat face.

25. The transmission of claim 23, wherein the valve seat is recessed.

26. The transmission of claim 23, wherein the valve seat and the seat face are of a conically sloped shape.

27. The transmission of claim 24, wherein the insert component is a ring-shaped insert.

28. The transmission of claim 27, wherein the valve piston has a first diameter on a side of the valve piston facing the valve seat, the valve piston has a second diameter on a side facing away from the valve seat, and the ring-shaped insert has an internal diameter, said first diameter being greater than said second diameter, and said second diameter being slightly smaller than said internal diameter.

* * * * *